Patented Feb. 7, 1939

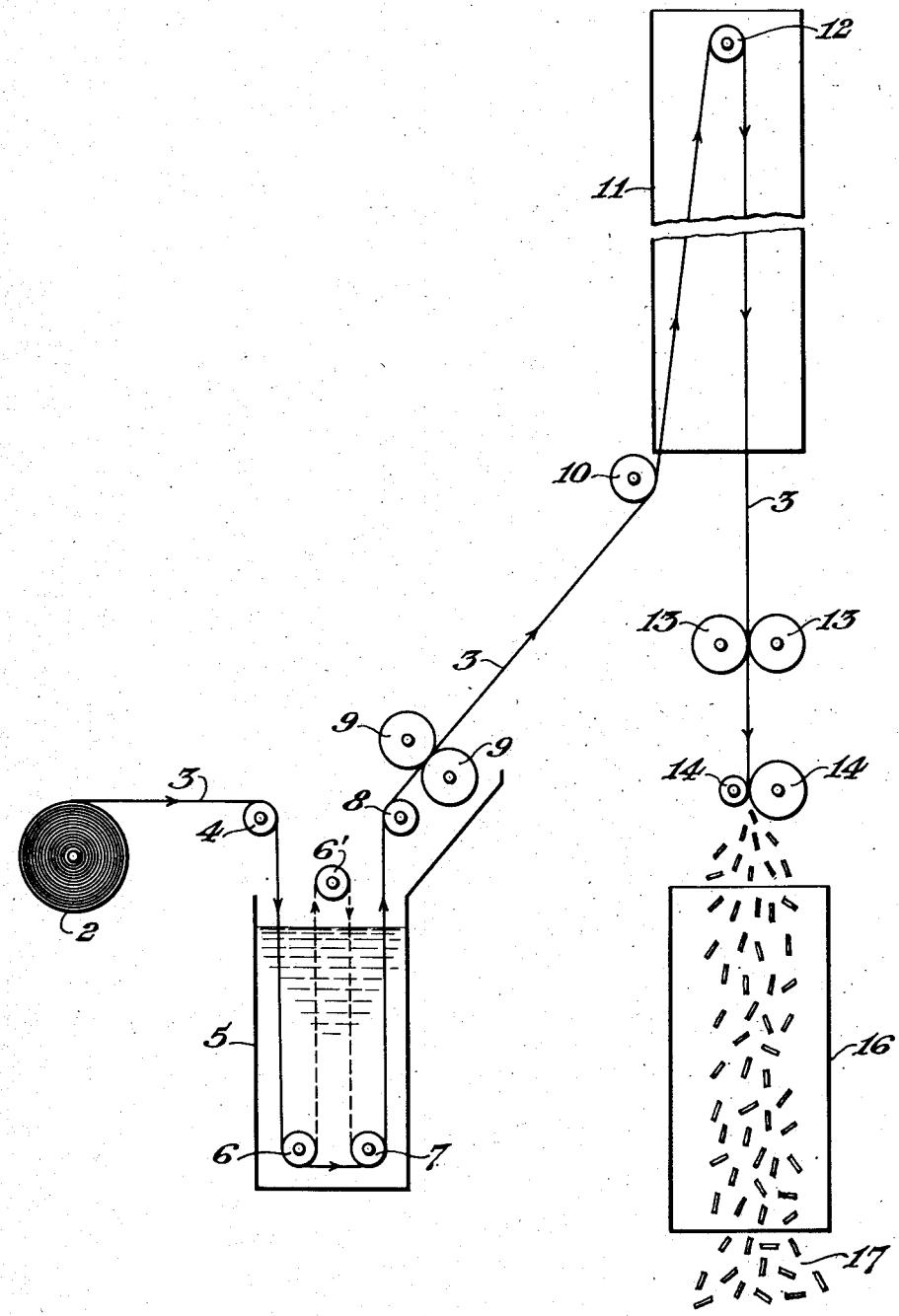

2,145,862

UNITED STATES PATENT OFFICE 2,145,862

ALKALI CELLULOSE

William R. Collings, Lee De Pree, and Merrill H. Weymouth, Midland, Mich., assignors to The Dow Chemical Company, Midland, Mich., a corporation of Michigan Application May 24, 1937, Serial No. 144,374

9 Claims. (Cl. 260—233)

This invention relates to a process for the production of alkali cellulose.

In the preparation of a highly etherified cellulose containing two or more substituent groups per anhydro-glucose unit, it has been recognized that the composition of the alkali cellulose employed must be within rather well defined limits. For example, to prepare an ethyl cellulose containing 48 to 50 per cent ethoxyl groups, by the etherification of an alkali cellulose with ethyl chloride, the preferred type of alkali cellulose contains an amount of alkali and of water corresponding to an alkali solution weighing between about 1.25 and about 4.0 times the weight of the cellulose present. Such an alkali cellulose has an alkali:cellulose ratio between about 1:1 and about 3:1 and a water:cellulose ratio between about 0.6:1 and about 2.0:1. Such ratios of alkali and of water to cellulose correspond to a solution of alkali in water having a concentration in the range from about 60 to 80 per cent. Alkali solutions of such concentrations have not been employed ordinarily, owing to the fact that the melting point of a 60 to 80 per cent aqueous solution of sodium hydroxide is in the range from about 55° to about 144° C. Temperatures in this range have been considered to exert an injurious effect upon the alkali cellulose, it having been stated that when alkali cellulose is subjected to temperatures substantially above room temperature, the cellulose molecule is degraded, and ether products formed therefrom have been thought to be too brittle for most commercial applications.

In some of the patented processes for the preparation of alkali cellulose, sodium hydroxide and water are used in proportions such that the alkali:cellulose and water:cellulose ratios correspond to those which would be obtained by the use of alkali solutions of the aforesaid concentration of about 60 to 80 per cent. Various procedures have been employed whereby this result may be obtained. According to one method, cellulose has been kneaded with the desired amount of water and of solid sodium hydroxide. In another process cellulosic fibers have been immersed in an alkali solution of 50 per cent concentration or less, the product then being subjected to squeezing or compression to remove some of the liquid alkali, thus reducing the water:cellulose ratio in the alkali cellulose formed during the immersion step, and subsequently mixing the product with sufficient solid alkali to increase the alkali:cellulose ratio to the range desired. Another process for the production of alkali cellulose having a high alkali:cellulose ratio and low water:cellulose ratio involves immersion of cellulosic material in an alkali solution of 50 per cent concentration or less, followed by a vacuum drying step to remove water from the product. If vacuum drying does not accomplish the removal of sufficient water to bring the water:cellulose ratio into the desired range, it has occasionally been the practice to add solid alkali to the partially dehydrated alkali cellulose, thus increasing the proportion of alkali:cellulose so as to furnish a product capable of being etherified to form highly substituted cellulose ethers. All of the afore-mentioned methods yield non-uniform alkali cellulose products which, when etherified, yield cellulose ethers of an indifferent degree of uniformity characterized by the existence therein of considerable quantities of partially etherified cellulosic materials commonly referred to as gels. The vacuum drying process which has been employed to reduce the water:cellulose ratio in an alkali cellulose exposes the alkali cellulose product to the effects of continued heating and results in undesirable degradation of the alkali cellulose and in a substantial reduction of the viscosity of solutions formed therefrom. Most of the procedures described in the prior art for the preparation of an alkali cellulose, by immersion of cellulose in an alkali solution, have involved soaking the cellulose for a period ordinarily ranging from 20 minutes to 24 hours or more, and at temperatures not substantially greater than 50° C. Such procedures are objectionable as they result in the solution of part of the cellulose in the alkali. The recovery of such cellulose from the alkali solution is inefficient and time-consuming.

Among the objects of the present invention is to provide a process for the production of alkali cellulose whereby the alkali:cellulose and water:cellulose ratio may be controlled within the desired limits. Another object is to provide a process for the preparation of alkali cellulose whereby every fiber of the cellulose is treated uniformly throughout with the same concentration of alkali, thus making possible the production of more uniform cellulose ethers than have previously been attainable. A further object is to provide a process for the preparation of alkali cellulose adapted to the production of highly etherified cellulose without employing solid alkali. A still further object is to provide a process for the preparation of an alkali cellulose having a low water:cellulose ratio without employing the usual squeezing operations to press out excess aqueous alkali. Another object is to provide a continuous process for the production of alkali cellulose under conditions such that undesirable degradation of the cellulose is substantially eliminated. A particular object is to provide a process whereby alkali cellulose may be produced, capable of being etherified to form water-insoluble cellulose ethers containing at least two molecular proportions of etherifying substituents for each anhydro-glucose unit, e. g. an ethyl cellulose containing more than 41 per cent ethoxyl groups.

To the accomplishment of the foregoing and related ends, the invention, then, consists of the steps and product hereinafter fully described and particularly pointed out in the claims, the annexed drawing and the following description setting forth in detail one mode of carrying out the invention, such disclosed mode illustrating, however, but one of the various ways in which the principle of the invention may be used.

The single figure of the annexed drawing is a sectional diagrammatic side elevation of an apparatus for carrying out our invention.

We have now discovered that it is possible to produce a highly uniform alkali cellulose capable of forming highly etherified products without undesirable degradation of the cellulose by conveying a sheet of cellulosic fibers at a substantially uniform rate continuously through a liquid bath of 60 to 80 per cent sodium hydroxide. The period of immersion in the alkali bath is ordinarily between 0.5 and 30 seconds and is so regulated that when the sheet leaves the bath, it has the appearance of being wet throughout with alkali liquor. The cellulosic sheet is removed from the alkali bath, alkaline liquor adhering to the surface of the sheet being allowed to run back into the bath. A sample of the alkali cellulose at this point if passed between compression rolls would lose considerable amounts of liquid alkali. The continuously moving sheet is thereafter conditioned for further operations by maintaining its temperature above the freezing point of the alkali solution contained therein while conveying it by suitable means for a period of 1 to 10 minutes or less. During this period, the fibers absorb the remaining liquid alkali from the interstices in the sheet and are themselves swelled to their maximum diameters. Proof that this phenomenon has taken place is obtained by compressing a sample of the so conditioned sheet between pressure rolls spaced apart a distance ordinarily not greater than half the thickness of the swelled sheet, whereupon it is observed that no liquid alkali is now squeezed from the sheet. The swelled sheet of alkali cellulose is then shredded or it may be simultaneously cooled and shredded.

We will now describe a preferred method of carrying out our invention for the preparation of completely alkali-impregnated cellulose fibers, with reference to the drawing. A sheet of cellulosic fibers 3 is continuously unwound from a supply roll 2, over guide roll 4, and is led at a uniform rate into and through a bath of sodium hydroxide 5 having a concentration above 60 per cent, preferably in the range of 75 to 78.5 per cent, and maintained at a temperature above the freezing point of the solution, i. e. from 55° to 144° C., and preferably from 90 to 120° C. The cellulosic sheet 3 passes under guide rolls 6 and 7, and thence out of the alkali bath 5. If it is desired to increase the length of contact between sheet 3 and the alkali bath 5, the sheet may be passed under guide roll 6, over roller 6', under roll 7, and thence out of the bath. The position of roller 6' is adjustable vertically, making it possible to alter the length of the path of the cellulose through the alkali bath, as desired. The cellulosic sheet, after having been impregnated in the alkali bath 5, is withdrawn from the bath over guide roll 8, through the take-out rollers 9. Excess adhering liquid alkali carried on the cellulosic sheet is prevented by the take-out rollers 9 from being carried further by the sheet and flows off from the exterior of the sheet, returning to bath 5. It is essential at this point that no excessive pressure be applied, as the interstices of the sheet contain a large quantity of liquid alkali that is not yet absorbed by the fibers. This liquid alkali should not be removed from the sheet but should be allowed to remain so that the subsequent swelling phenomenon, caused by its absorption into the fibers, may take place. The alkali-impregnated sheet 3 is drawn into a conditioning chamber 11, its path being governed by guide rolls 10 and 12. The temperature of chamber 11 may be at or above 40° C. to prevent the alkali in the impregnated sheet from solidifying, or if desired, the exit end of chamber 11 may be cooled, suitably by means of cold air, so as to effect solidification of the alkali in the sheet after the alkali cellulose has swelled to its maximum thickness. From chamber 11, the alkali cellulose sheet 3 is drawn through compression rolls 13. It is noteworthy that although these compression rolls are spaced apart a distance ordinarily less than half the thickness of the swelled sheet, no liquid alkali is removed from the sheet at this point as it has been completely absorbed by the cellulose fibers. After passing the compression rollers 13, the alkali cellulose is fed into one or more sets of differential speed rollers 14, the members of which are spaced apart a distance less than the original thickness of the sheet. In each of these latter sets of rollers, one is adjusted to rotate at a rate substantially greater than the other, and in passing therethrough, the alkali cellulose sheet is shredded, producing a finely divided mass of alkali cellulose particles 17 which are then discharged from the system through a cooling zone 16. The product is now ready for etherification. If desired, another type of shredder may be substituted for the differential speed rollers 14, illustrated in the drawing. The total elapsed time of passage of the pulp sheet 3, from feed roll 2 through the disintegrating rollers 14, is ordinarily from 3 to 10 minutes. The actual rate of feed may be varied, however, depending on the nature of the fibers in the sheet and on the ability of the sheet to absorb liquid alkali.

By a suitable modification of the apparatus described above, a series of cellulose sheets or any suitable aggregate of cellulosic fibers may be employed rather than a continuous roll. This may be accomplished by conveying cut sheets or other form of fibrous material through an alkali bath suitably on a continuous belt or screen conveyor. Sheets of any desired thickness may be employed, provided that their rate of passage through the alkali bath is adjusted so as to permit the desired degree of impregnation to take place.

A study was made of three typical commercially available pulp sheets of high alpha-cellulose content, which we shall refer to as pulps A, B, and C. Sheet A was soft, relatively thick and had little strength; B was hard and quite strong; and C was highly absorbent and harder than A but somewhat softer than B. Sheets A and B required approximately the same length of time to become completely impregnated with sodium hydroxide of approximately 75 per cent concentration, while sheet C required on the average twice as long as sheets A and B to reach the same stage of impregnation. The alkali cellulose obtained from these three sheets showed that pulp C, after being completely impregnated, had an alkali content intermediate between that of sheets A and B.

The term "complete impregnation" hereinafter employed is used to designate that condition in which the rate and length of passage of the cellulosic sheet through the alkali bath is such that on emerging from the bath all of the cellulosic fibers have the appearance of being wet. This condition is recognized in an alkali-impregnated pulp sheet by the absence of dry white spots of unimpregnated fibers in the damp sheet of alkali cellulose. When the immersion time is increased above that required to produce "complete impregnation", we have termed the product "over-impregnated".

The amounts of alkali required to produce a completely impregnated cellulosic aggregate should be accurately known, since the alkali:cellulose and water:cellulose ratios control the degree to which the alkali cellulose can be etherified. We have found that, when the cellulosic sheet is withdrawn from the alkali bath at the instant it is completely impregnated, the alkali:cellulose ratio in the shredded alkali cellulose may vary over a wide range depending upon the strength of the alkali solution employed and upon the type of cellulosic sheet used. By using liquid sodium hydroxide ranging in concentration between 60 and 80 per cent, it is possible to form an alkali cellulose which will be readily ethylated yielding an ethyl cellulose having an ethoxyl content in the range from 40 to 50 per cent. For example, a cellulose pulp which has been conveyed through a bath of sodium hydroxide of approximately 75 to 78.5 per cent concentration at a rate slower than that at which complete impregnation of the same pulp would occur, forms an "over impregnated" alkali cellulose which, when conditioned and shredded in the mode described above, is capable of being ethylated to produce ethyl cellulose having an ethoxyl content of from 48 to 50 per cent.

Cellulose viscosity determinations referred to in the following examples were all made employing a modification of the process described in the publication "Standards, Tentative and Official Testing Methods, Recommended Practices, Specifications of the Technical Association of the Pulp and Paper Industry" under the heading "Cuprammonium disperse viscosity of pulp. T-206m. Official standard, April 15, 1933." This method, referred to as the TAPPI method, is ordinarily applied to 1 per cent solutions of cellulose in a cuprammonium hydroxide solvent containing 15 grams of copper and 200 grams of ammonia per liter. We have found it more convenient to carry out our determinations employing a cuprammonium solvent containing 30 grams of copper and 200 grams of ammonia per liter. In all other respects our modification of the TAPPI method is the same as that described in the publication referred to. In carrying out viscosity determinations on an alkali cellulose sample, the product is carefully free from alkali and the 1 per cent cuprammonium solution thereof is based on the weight of the cellulose contained in the alkali cellulose being tested.

The following examples illustrate the practice of our invention:

EXAMPLE 1

*Use of 70 per cent sodium hydroxide in the preparation of alkali cellulose*

A strip of pulp B, having a thickness of 0.024 inch, and a water content of 6 per cent, was led continuously into and through a bath of 70 per cent sodium hydroxide maintained at a temperature of 66° C., at a rate of 22 feet per minute, the distance of travel in the alkali bath being such that the period of contact between the cellulosic sheet and the liquid alkali was 18 seconds. The clearance between the take-out rolls was sufficient to pull the sheet from the bath without effecting any substantial squeezing. The temperature of these rolls was maintained above the freezing point of the alkali solution. A sample of the alkali cellulose sheet as it passed the take-out rolls contained an amount of alkali and water corresponding to 2.16 parts of 70 per cent aqueous sodium hydroxide per part of cellulose. After passing the take-out rolls the sheet was immediately introduced into the conditioning chamber which was maintained at room temperature. The temperature of the sheet as it left the conditioning chamber was about 85° C., considerably above the freezing point of the alkali solution, and the thickness of the sheet was 0.070 to 0.075 inch. This proved to be the maximum thickness to which a sheet of pulp B would swell under the condition employed. The cooling and compression rolls spaced apart a distance of 0.033 inch and cooled to a temperature of 3° C. served to compress the sheet before it reached the shredding rolls, but did not remove any liquid alkali from the sheet. The shredding rolls were also cooled to 3° C. by means of circulating ice-water. Two sets of such rolls were used, the first of which was spaced apart a distance of 0.018 inch and the second set a distance of 0.017 inch. The product issued from the second set of shredding rolls in the form of small thin flakes of alkali cellulose, the temperature of which was approximately 67° C. It is to be noticed that there was a substantial reduction in the temperature of the sheet during the shredding operation, in spite of the friction due to the scuffing and tearing action of the differential speed rollers. The alkali cellulose was further shredded in a water-jacketed shredder until the temperature of the product was 30° C. The cellulose in the shredded product had a viscosity of 130 centipoises according to the modified TAPPI method, described above. When the alkali cellulose product was completely reacted with ethyl chloride in excess at 120° C., an ethyl cellulose was obtained, the ethoxyl content of which was 43.7 per cent. A 5 per cent solution thereof by weight in 67 volumes of benzene and 33 volumes of methanol had a viscosity of 136 centipoises at 25° C.

EXAMPLE 2

*Use of 77.5 per cent sodium hydroxide in the preparation of alkali cellulose suitable for the preparation of highly etherified ethyl cellulose*

A strip of pulp A, about 0.050 inch thick, was fed continuously into and through a bath of liquid 77.5 per cent sodium hydroxide, the temperature of which was held at or about 109° C. The rate of travel of the cellulosic sheet was 22 feet per minute and the distance of travel thereof through the liquid alkali bath was such that the contact time between the cellulose and the liquid alkali in the bath was approximately 9 seconds. The alkali-impregnated sheet was removed from the bath and conveyed through the conditioning zone in a manner similar to that described in the preceding example. Analysis of the alkali cellulose as it left the conditioning zone showed it to contain an amount of alkali and of water equivalent to 2.84 parts of 77.5 per cent sodium hydroxide solution per part of cellulose. The thickness of the alkali cellulose sheet reached a maximum of approximately 0.125 inch before the sheet was passed between the compression rollers spaced apart a distance of 0.038 inch. No liquid alkali was removed from the sheet by the squeezing action of the compression rollers. The product was flaked and subsequently reshredded as described in the foregoing example. The viscosity of the cellulose in the shredded alkali cellulose product, determined by the modified TAPPI method, was approximately 25 centipoises. This product, when ethylated as described in the previous example, yielded an ethyl cellulose having an ethoxyl content of 48 per cent and a viscosity of 47 centipoises when dissolved to form a 5 per cent solution by weight in 80 parts of toluene and 20 parts of absolute ethanol by volume at 25° C. A film of the ethyl cellulose produced had a tensile strength of 560 kilograms per square centimeter of original cross-section and was capable of elongation to the extent of 22 per cent.

The ability of an ethyl cellulose film to elongate and the strength of the film has been found to be a function of the mode of preparation of the alkali cellulose from which the ethyl cellulose was produced. Undesirable degradation of the alkali cellulose is indicated by weak ethyl cellulose films capable of little elongation. Such products are too brittle to be of commercial value. A film of the ethyl cellulose produced from the alkali cellulose in Example 2 when heated for 16 hours in a closed tube at 120° C., was found to have retained more than 95 per cent of its original viscosity and to be quite flexible. If undesirable degradation had occurred in the preparation of alkali cellulose, the viscosity reduction observed as a result of this heat stability test would have been 25 per cent or more. Ethyl cellulose films made from alkali cellulose produced in our process have been found to retain their flexibility under these conditions for more than 20 days.

The ethyl cellulose produced in Example 2 was completely soluble in benzene, toluene, and xylene, forming sparkling clear solutions free of haze and gels. It also gave sparkling clear solutions in mixed solvents such as a 67:33 mixture by volume of benzene and methanol and an 80:20 volume mixture of toluene and ethanol. It was completely soluble in ethanol, in butanol, ethyl acetate, and acetone. The high solubility of ethyl cellulose prepared by this process in the various single solvents, particularly its solubility in xylene and in methanol, is an indication of the high degree of uniformity of the alkali cellulose from which the ether was prepared. For example, we have found that when an ethyl cellulose contains any appreciable amount of material having 46 per cent ethoxyl content, its solution in xylene contains gels, and an ethyl cellulose containing any appreciable amount of the material having an ethoxyl content of 50 per cent yields murky white solutions in methanol. The fact that neither of these conditions existed in solutions of the ethylation product formed from our alkali cellulose shows that not only is the statistical average of all of the products about 48 per cent ethoxyl, but that little if any of the material varied as much as 2 per cent from this value.

Although the alkali:cellulose and water:cellulose ratios may vary widely in the alkali cellulose compositions producible from different types of cellulosic aggregates, we have found that in our process we can produce the desired type of cellulose ether, namely, one containing from about 2.0 to about 2.75 etherifying substituents per anhydro-glucose unit from any type of high alpha cellulosic material by converting the same into an alkali cellulose containing between about 1.25 and about 4.0 parts by weight of 60 to 80 per cent sodium hydroxide solution per weight of cellulose, prior to etherification. Alkali celluloses containing this amount of alkali and of water when allowed to swell to their maximum dimension and subsequently compressed to one-half of their swelled thickness, as for example when passed between the compression rolls described in connection with our process, lose no liquid alkali.

Our invention has been illustrated with reference to the preparation of soda-cellulose and the production therefrom of ethyl cellulose. Potash cellulose or mixtures thereof with soda-cellulose may be as readily prepared as the alkali cellulose herein discussed, and other ethers may be prepared therefrom without departing from the intended scope of the present invention.

The term "moderate compression" employed in the following claims means that moderate working pressure which we have employed in our process. More particularly, it is the amount of pressure required to reduce by about one-half the thickness of a sheet of alkali cellulose swelled to its maximum dimension and corresponds to the pressure exerted by our compression rollers on a swelled sheet of alkali cellulose between the conditioning chamber and the disintegrating or shredding mechanism. We do not imply that liquid alkali could not be squeezed from a swelled sheet of alkali cellulose if extreme pressures were applied thereto, e. g. if subjected to the pressure of a hydraulic ram.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:—

1. The process which comprises immersing an aggregate of cellulosic fibers in a bath of aqueous alkali having an alkali concentration between about 60 and about 80 per cent and maintained at a temperature between about 55° and 144° C., and removing the impregnated aggregate from the bath as soon as it has absorbed between about 1.25 and about 4.0 times its weight of alkali solution.

2. The process which comprises immersing an aggregate of cellulosic fibers in a bath of aqueous alkali having an alkali concentration between about 75 and about 78.5 per cent and maintained at a temperature between about 90° and about 120° C., and removing the impregnated aggregate from the bath as soon as it has absorbed between about 1.25 and about 3.2 times its weight of alkali solution.

3. In a process for the preparation of uniform alkali cellulose adapted to the production of cellulose ethers, the steps which consist in immersing a sheet of cellulosic fibers in a bath of aqueous alkali maintained at a temperature in the range from about 55° to 144° C. and having an alkali concentration between about 60 and about 80 per cent, and removing the impregnated cellulosic sheet from the bath after a period of contact between the cellulose and the liquid alkali in the bath of between about 0.5 and about 30 seconds, maintaining the temperature of the so impregnated sheet above the hardening point thereof for a period between 1 and 10 minutes, and immediately thereafter cooling the alkali cellulose to a temperature below the freezing point of the alkali therein contained.

4. In a process for the preparation of a uniform alkali cellulose, the step which consists in continuously passing a sheet of cellulose at a substantially uniform rate through a bath of sodium hydroxide having a concentration of between about 75 and about 78.5 per cent, at a temperature from about 90° to about 120° C., the period of contact between the cellulose and the liquid alkali in the bath being adjusted to between about 0.5 and 30 seconds.

5. In a process for the preparation of a uniform alkali cellulose adapted to the production of highly etherified cellulose, the steps which consist in continuously passing a sheet of cellulose at a substantially uniform rate through a bath of aqueous alkali having a concentration between about 75 and about 78.5 per cent at a temperature in the range from about 90 to 120° C., the period of contact between the cellulose and the liquid alkali in the bath being adjusted to between about 0.5 and 30 seconds, conveying the alkali cellulose to a shredder and effecting shredding thereof while cooling the alkali cellulose to a temperature below its hardening point, the rates of shredding and cooling being such that the sheet is substantially disintegrated into finely divided particles before hardening of the alkali cellulose occurs.

6. In a process for the preparation of a uniform alkali cellulose adapted to the production of highly etherified cellulose, the steps which consist in continuously passing a sheet of cellulose through a bath of sodium hydroxide having a concentration between about 60 and about 80 per cent at a temperature in the range from about 55° to 144° C., at a substantially uniform rate such that the alkali impregnated sheet is removed from the bath after a period of contact between the cellulose and the liquid alkali in the bath of between about 0.5 and 30 seconds, maintaining the temperature of the so impregnated sheet above the hardening point thereof for a period of between 1 and 10 minutes while conveying the alkali cellulose to an apparatus for disintegrating the same, effecting a substantial disintegration of the sheet into relatively small particles while maintaining the temperature of the alkali cellulose above its hardening point, and thereafter effecting further disintegration while cooling the alkali cellulose to a temperature below the freezing point of the alkali therein contained.

7. In a process for the preparation of a uniform alkali cellulose adapted to the production of highly etherified cellulose, the steps which consist in continuously passing a sheet of cellulose at a substantially uniform rate through a bath of aqueous alkali having a concentration between about 75 and about 78.5 per cent, at a temperature in the range from about 90° to 120° C., the period of contact between the cellulose and the liquid alkali in the bath being adjusted to between about 0.5 and about 30 seconds, conveying the alkali cellulose to a shredder and effecting a substantial disintegration of the sheet into relatively small particles while maintaining the temperature of the alkali cellulose above its hardening point, and thereafter effecting further disintegration while cooling the alkali cellulose to a temperature below the freezing point of the alkali therein contained.

8. In a process for the preparation of a uniform alkali cellulose adapted to the production of highly etherified cellulose, the steps which consist in continuously passing a sheet of cellulose through a bath of sodium hydroxide having a concentration between about 75 and about 78.5 per cent at a temperature in the range from about 90° to about 120° C., at a substantially uniform rate such that the period of contact between the cellulose and the liquid alkali in the bath is between about 0.5 and 30 seconds, removing the so impregnated sheet from the bath, maintaining the temperature of the alkali impregnated sheet above the hardening point thereof for a period between 1 and 10 minutes while conveying the alkali cellulose to an apparatus for disintegrating the same, effecting a substantial disintegration of the sheet into relatively small particles while maintaining the temperature of the alkali cellulose above its hardening point, and thereafter effecting further disintegration while cooling the alkali cellulose to a temperature below the freezing point of the alkali therein contained.

9. In a process for the preparation of a uniform alkali cellulose adapted to the production of highly etherified cellulose, the steps which consist in continuously passing a sheet of cellulose through a bath of sodium hydroxide having a concentration between about 75 and about 78.5 per cent at a temperature in the range from about 90° to 120° C., at such a substantially uniform rate that the emerging cellulosic sheet contains between about 1.25 and about 3.2 times its weight of alkali solution, maintaining the temperature of the so impregnated sheet above the hardening point thereof for a period between 1 and 10 minutes while conveying the alkali cellulose to an apparatus for disintegrating the same, and effecting a substantial disintegration of the sheet into relatively small particles while maintaining the temperature of the alkali cellulose above its hardening point, and thereafter effecting further disintegration while cooling the alkali cellulose to a temperature below the freezing point of the alkali therein contained.

WILLIAM R. COLLINGS.
LEE DE PREE.
MERRILL H. WEYMOUTH.